(12) United States Patent  (10) Patent No.: US 8,448,869 B2
Rossiter  (45) Date of Patent: May 28, 2013

(54) MICROCIRCUIT CARD IN SEVERAL PARTS

(75) Inventor: William F. Rossiter, Long Beach, CA (US)

(73) Assignee: Oberthur Technologies, Levallois-Perret (FR)

( * ) Notice: Subject to any disclaimer, the term of this patent is extended or adjusted under 35 U.S.C. 154(b) by 744 days.

(21) Appl. No.: 10/573,777

(22) PCT Filed: Sep. 28, 2004

(86) PCT No.: PCT/FR2004/002453
§ 371 (c)(1),
(2), (4) Date: Mar. 28, 2006

(87) PCT Pub. No.: WO2005/034030
PCT Pub. Date: Apr. 14, 2005

(65) Prior Publication Data
US 2007/0108294 A1  May 17, 2007

(30) Foreign Application Priority Data
Sep. 29, 2003  (FR) ..................................... 03 11364

(51) Int. Cl.
G06K 19/06  (2006.01)
(52) U.S. Cl.
USPC ........... 235/492; 235/380; 235/487; 235/488; 235/493; 235/494

(58) Field of Classification Search
USPC ................. 235/380, 487, 488, 492, 493, 494
See application file for complete search history.

(56) References Cited

U.S. PATENT DOCUMENTS

| 5,581,065 A | * | 12/1996 | Nishikawa et al. | ........... 235/492 |
| 6,471,127 B2 | * | 10/2002 | Pentz et al. | ................... 235/487 |
| 6,575,375 B1 | | 6/2003 | Boccia et al. | |
| 6,588,658 B1 | * | 7/2003 | Blank | .............. 235/380 |
| D498,788 S | * | 11/2004 | Lubking | ........................ D19/10 |
| 6,978,940 B2 | * | 12/2005 | Luu | ............... 235/486 |
| 7,065,195 B1 | * | 6/2006 | Smith et al. | ............. 379/144.01 |
| 7,384,000 B2 | * | 6/2008 | Anders et al. | ................. 235/488 |
| 2003/0132300 A1 | * | 7/2003 | Dilday et al. | ................. 235/487 |
| 2005/0230485 A1 | * | 10/2005 | Ross et al. | .................... 235/492 |

FOREIGN PATENT DOCUMENTS

| DE | 199 43 092 | | 3/2001 |
| FR | 2 817 063 | | 5/2002 |
| WO | WO 02/066226 | * | 8/2002 |
| WO | WO 02/101641 | | 12/2002 |

* cited by examiner

Primary Examiner — Daniel Hess
Assistant Examiner — Tabitha Chedekel
(74) Attorney, Agent, or Firm — Young & Thompson

(57) ABSTRACT

A card comprises a body with a precut microcircuit card, characterized in that a token is also precut in the body of the card, adjacent to the microcircuit card.

20 Claims, 2 Drawing Sheets

MICROCIRCUIT CARD IN SEVERAL PARTS

The present invention relates to microcircuit cards precut into a plastic support.

BACKGROUND OF THE INVENTION

In the art of microcircuit cards, also known as microchip cards, the size and shape of the cards are generally defined by standards in widespread use in the industry. There are known in the art in particular the ID-000 format used mainly for mobile telephone operator subscriber identification cards, known as SIM (Subscriber Identification Module) cards or plug-in SIM cards in the case of GSM, CDMA and TDMA telephones or USIM (Universal Subscriber Identification Module) cards and the ID-1 format (derived from the ISO standard 7810) used for bank cards and credit cards, for example.

In theory the fabrication and logistical costs of an ID-000 format card are significantly lower than those of an ID-1 format card, in particular because of economies in terms of the plastic material, the area to be printed and the transportation and storage volume and weight. However, in the case of ID-1 format cards, card fabrication and personalization procedures are a mature technology utilizing reliable machines.

This is one reason why, in the mobile telephone art in particular, cards are sold in the form of ID-000 format microcircuit cards precut into an ID-1 format card body. The user can therefore use his card in a reader adapted to read the ID-1 format or detach the ID-000 format microcircuit card from the ID-1 format card body, for example before inserting it into his mobile telephone. It is therefore increasingly the case that the ID-1 format card body is in practice merely a simple temporary support for the SIM card.

When the user detaches his SIM card from its support, the latter is generally thrown away, unless there is provision for the SIM card to be re-integrated into it, although this latter situation is of little significance in practice. Thus, although this makes it possible to continue to obtain the benefit of the technology developed for ID-1 format cards, most SIM cards are currently sold in an ID-1 format support that is almost immediately discarded by the user.

An object of the invention is to overcome this drawback and to increase the usefulness of the support.

SUMMARY OF THE INVENTION

The invention consists in a card comprising a body with a precut microcircuit card, characterized in that a token is also precut in the body of the card next to the microcircuit card.

The fact that a token is precut into the support next to a microcircuit card that is also precut provides for a portion of the card body to have some use after detaching the microcircuit card, independently of the latter, as well as facilitating its detachment since pressing the junction area between the microcircuit card and the token requires only a modest force. The token may have many applications: it may serve as a badge, carrying data to be read mechanically or magnetically (it can therefore carry the same information as a credit card but in a smaller format), a promotional gift carrying the logo of the card supplier, for example, together with helpline numbers, a utilitarian object such as a key fob, etc.

This token preferably extends from the microcircuit card to one corner, which helps to maximize the area of the token and therefore the area of the portion of the card body that retains some utility after detaching the microcircuit card.

Nevertheless, to preserve satisfactory stiffness of the card in its original configuration, the token advantageously extends to only one corner of the card body, meaning that there remains, apart from the microcircuit card and the token, a generally L-shaped residual portion that has the maximum dimensions of the card body. There is therefore no risk of unintentional bending of the body as a whole, despite the precut microcircuit card and the precut token. The area of the token is increased if the token is precut between the microcircuit card and the corner at the greatest distance from it.

To facilitate detachment, the token preferably has sides that are at least approximately rectilinear (or only slightly curved).

To facilitate manufacture, the token preferably has sides that are at least approximately parallel to those of the card body.

Those sides are advantageously at least approximately aligned with the sides of the microcircuit card.

The microcircuit card advantageously has a standardized format, preferably the SIM (ID-000) format. It is equally advantageous if the card body has some other standardized format, preferably the credit card (ID-1 or CR-80) format. It must nevertheless be clearly understood that other formats are possible, for example specific to the card providers, to guarantee recognition of its product.

The token may include visual information, for example data identifying the carrier, a photo, a logo, useful addresses or telephone numbers, etc. The visual information may in particular be printed with ink or formed as a raised pattern.

The token may also include a magnetic strip for storing information, like standard magnetic cards, which can provide access to a service or even enable physical access in the manner of a badge, etc.

To facilitate handling, the token advantageously includes a member for fixing it to a key-ring or a belt loop, for example: thus it preferably includes a hole through which can be passed a key-ring, a clip at the end of a chain, etc. This hole is preferably situated in the vicinity of the microcircuit card.

The token is preferably joined to the remainder of the card body by mechanically weakened areas consisting of grooves, perforations in the material in the form of "dashed lines", etc.

BRIEF DESCRIPTION OF THE DRAWINGS

Objects, features and advantages of the invention emerge from the following description given by way of illustrative and nonlimiting example with reference to the appended drawings in which.

DETAILED DESCRIPTION OF THE PREFERRED EMBODIMENTS

Figure 1:
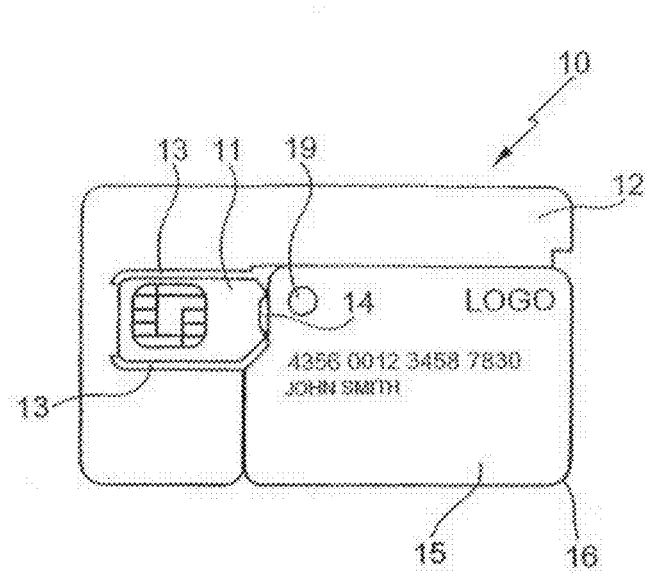
FIG. 1 is a front view of a card of the invention.
Figure 2:
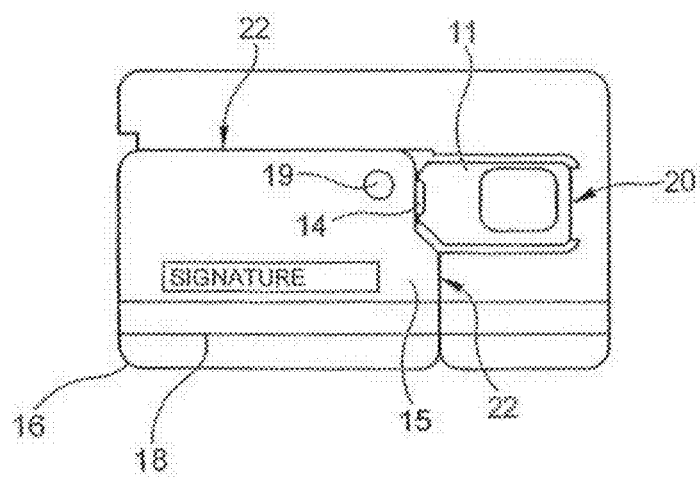
FIG. 2 is a back view of the card.
Figure 3:
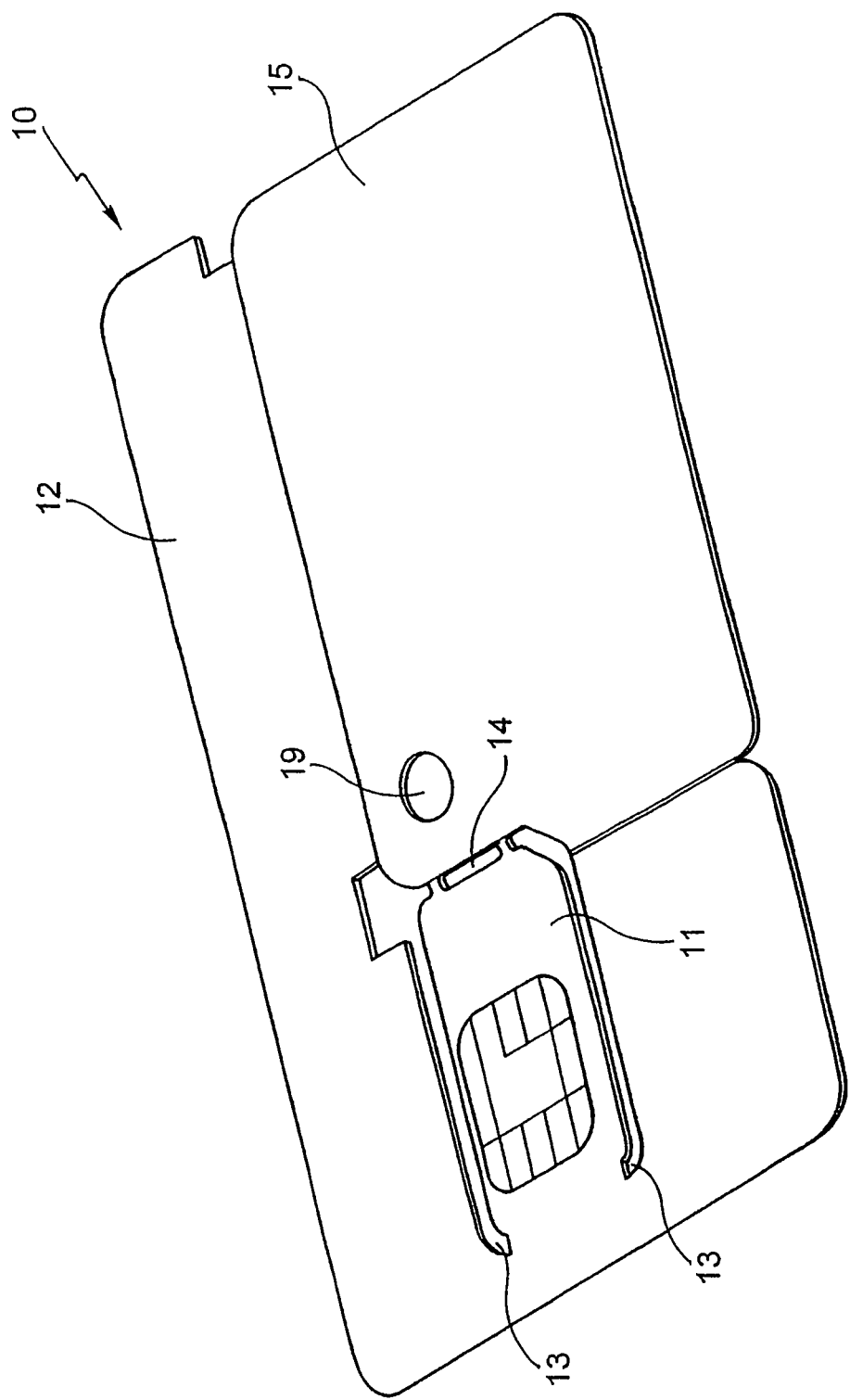
FIG. 3 is a perspective view of the card.

FIGS. 1 to 3 represent a card 10 including a microcircuit card 11 in a card body 12.

The microcircuit card is of an appropriate type known in the art, advantageously of the ID-000 format, for example a SIM or USIM card.

The microcircuit card is precut. Thus there are seen, around the card, two slots 13, which here are parallel to the longer sides of the card 10, and a transverse slot 14. The contour of the microcircuit card 11 is completed by lines of mechanical weakening, for example grooves 20.

Note that the location of the microcircuit card 11 is off-centre with respect to the card 10 because the microcircuit of the small card 11 is at the location it would normally have in a real card with the same format as the card 10. This ensures compatibility with an ID-1 card reader before the small card is detached.

The microcircuit card includes a microcircuit as such and contacts (not shown). This is known in the art.

In the example represented, the card 10 has the ID-1 or CR-80 format and the microcircuit card 11 has the ID-000 format, which means that well-known prior art techniques can be used for fabricating the card.

According to the invention, a token 15 is also precut into the card body next to the microcircuit card.

As shown, this token extends to one corner of the card body, here the bottom right-hand corner 16 (as seen in FIG. 1). Note that in the present example the token extends only to that corner, and does not extend to either top corner.

It is in fact preferable to select this corner because it is the corner at the greatest distance from the microcircuit card.

The token is next to the microcircuit card in the sense that a portion of the contour of the token also constitutes a portion of the contour of the card 11.

Here the token is of rectangular general shape with sides at least approximately parallel to those of the card body 12.

To be more precise, in the present example, the sides of the token are at least approximately aligned with the sides of the microcircuit card; the top side of the token is therefore approximately in line with the top side of the card 11 and the left-hand side of the token constitutes the right-hand side of the microcircuit card, initially running vertically and then at an angle.

In the example considered here, the token is a magnetic card with characteristics similar to those of most magnetic cards known in the art, but having a different format. There can therefore be seen on its front face (FIG. 1) a supplier logo, a number and the name and forenames of the holder (this can be printed when personalizing the microcircuit card, as a function of information about the holder provided during personalization). This visual information may be applied in ink, thermally or by embossing, yielding characters in relief.

There may also be a photo, for example of the holder, or any other design.

On the back of the token (see FIG. 2) there is an area on which the user can write personal information, for example his signature. There may also be a magnetic band (or strip) 18 for magnetic storage of information, for example on the balance of an account, etc.

The magnetic band 18 preferably has a length of not less than 2.25 inches. This is known in the art. This band may be limited to the token but may instead extend over the remainder of the card body. This band in practice respects Hi-Lo coercivity criteria. The stored information is advantageously coded by compression from 210 bpi to 260 bpi on IATA and 75 bpi to 100 bpi on ABA.

Bar codes may also be printed on the front or back of the token.

In a variant that is not shown, the token may include a microcircuit instead of the magnetic band.

The token may also be of the contactless type or a radio-frequency identification (RFID) label.

The token advantageously includes a hole 19 through which a key-ring, clip, etc. may be passed. Here this hole is in the corner of the token that is nearest the microcircuit card.

Outside the portion common to the contour of the microcircuit card, the contour of the token 15 is defined by one or more mechanically weakened lines, preferably consisting of grooves 22.

When the holder receives his card, it is in practice personalized, at least in respect of the microcircuit card. It is then sufficient to press the common portion of the contours of the card and the token to separate them virtually instantaneously.

The invention claimed is:

1. A card, comprising:
a card body, comprised of i) a microcircuit card precut in the card body, ii) a token precut in the card body so as to be adjacent to the microcircuit card and extending up to a corner of the card body, and iii) a remainder portion of the card body removably joined to both the microcircuit card and the token,
the token carrying visual information,
the remainder portion being an L-shaped residual portion extending along outermost sides of the card body to form three outermost corners of the card,
the microcircuit card being a mobile telephone operator subscriber identification card,
the card body conforming to the ID-1 format, and
the location of the microcircuit card in the card body being such that the card body is usable in an ID-1 card reader.

2. The card according to claim 1, wherein the token extends to only one corner of the card body.

3. The card according to claim 2, wherein the token extends to a corner having a furthest distance from the microcircuit card.

4. The card according to claim 2, wherein the token has sides at least approximately parallel to those of the card body.

5. The card according to claim 4, wherein the token has sides at least approximately aligned with the sides of the microcircuit card.

6. The card according to claim 2, wherein the token includes a magnetic strip configured to store information.

7. The card according to claim 1, wherein the token includes a magnetic strip configured to store information.

8. The card according to claim 1, wherein a hole is provided in a corner of the token in a vicinity of the microcircuit card.

9. The card according to claim 1, wherein the token is connected to the remainder portion of the card body by mechanically weakened areas consisting of grooves.

10. The card according to claim 1, wherein the token is a contactless type.

11. The card according to claim 1, wherein the token is a radio-frequency identification label.

12. The card according to claim 1, wherein the visual information includes personalizing information.

13. The card according to claim 1, wherein the visual information includes an address or a phone number.

14. The card according to claim 1, wherein the visual information is provided in ink.

15. The card according to claim 1, wherein the visual information comprises characters in relief.

16. The card according to claim 1, wherein the L-shaped portion is formed as a single piece.

17. The card according to claim 1, wherein the L-shaped portion is formed of a rigid member.

18. A card, comprising:
a body, with a microcircuit card precut in the body, with a token precut in the body so as to be adjacent to the microcircuit card and extending up to only a single corner of the body, and with a remainder portion removably joined to both the microcircuit card and the token,
the remainder portion being an L-shaped residual portion extending along outermost sides of the card body to form three outermost corners of the card,
wherein the token includes a medium having magnetic data stored thereon, wherein the microcircuit card is a mobile telephone operator subscriber identification card, and wherein the body and a location of the microcircuit card within the body are in conformance with ID-1 format such that the body is compatible with an ID-1 card reader.

19. A card, comprising:

a body, with a microcircuit card precut in the body, with a token precut in the body so as to be adjacent to the microcircuit card and extending up to only a single corner of the body, and with a remainder portion removably joined to both the microcircuit card and the token, the remainder portion being an L-shaped residual portion extending along outermost sides of the card body to form three outermost corners of the card, the token carrying visual information for identifying a carrier associated with the microcircuit card, the microcircuit card being a mobile telephone operator subscriber identification card, and the body and a location of the microcircuit card within the body being in conformance with ID-1 format such that the body is compatible with an ID-1 card reader.

20. A card, comprising:

a body, with a microcircuit card precut in the body, with a token precut in the body extending up to a single corner of the body, and with a remainder portion removably joined to both the microcircuit card and the token, the remainder portion being an L-shaped residual portion extending along outermost sides of the card body to form three outermost corners of the card, the microcircuit card being a mobile telephone operator subscriber identification card, the token carrying visual information and a magnetic strip, and the body and a location of the microcircuit card within the body being in conformance with ID-1 format such that the body is compatible with an ID-1 card reader.

* * * * *

UNITED STATES PATENT AND TRADEMARK OFFICE
CERTIFICATE OF CORRECTION

PATENT NO. : 8,448,869 B2  Page 1 of 1
APPLICATION NO. : 10/573777
DATED : May 28, 2013
INVENTOR(S) : William F. Rossiter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this

Eighth Day of September, 2015

Michelle K. Lee
*Director of the United States Patent and Trademark Office*